Oct. 23, 1934.    J. C. REAR    1,978,226
CAR ICER
Filed July 21, 1932    6 Sheets-Sheet 4
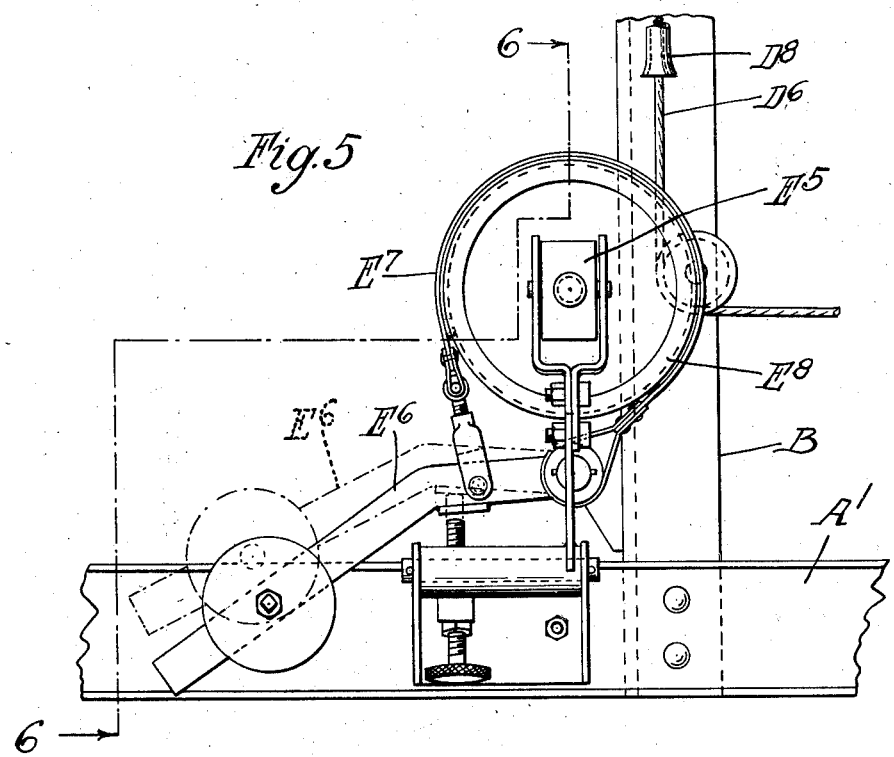
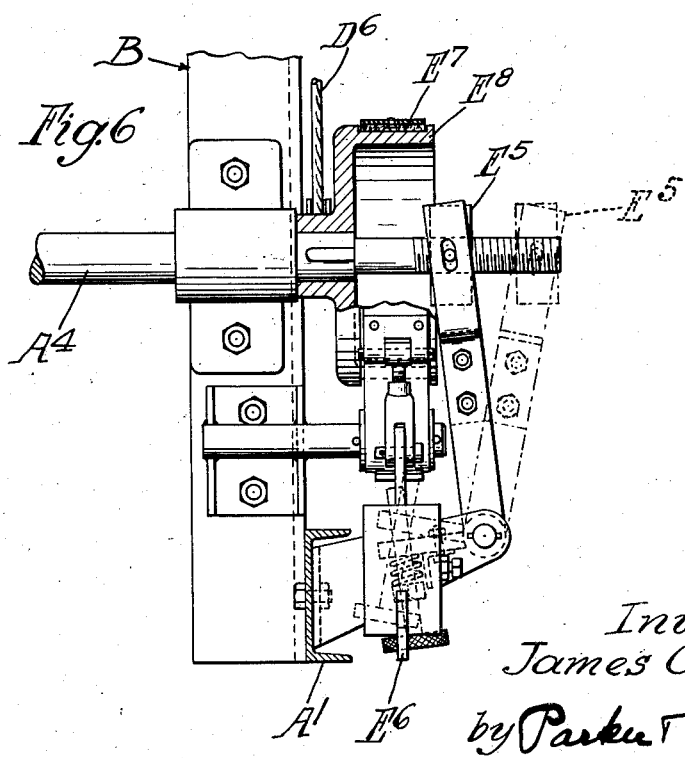
Inventor
James C. Rear
by Parker & Carter
Attorneys.

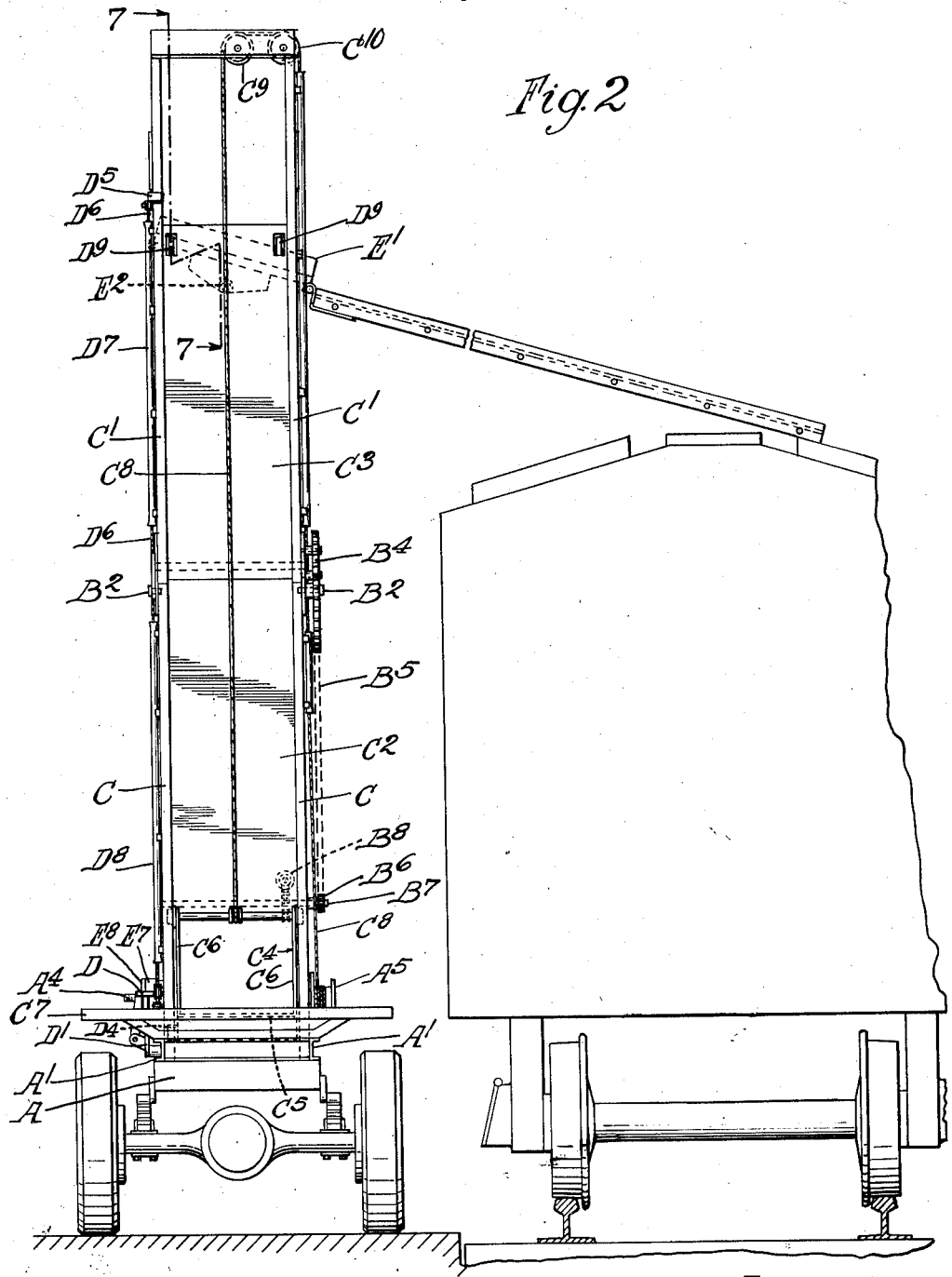

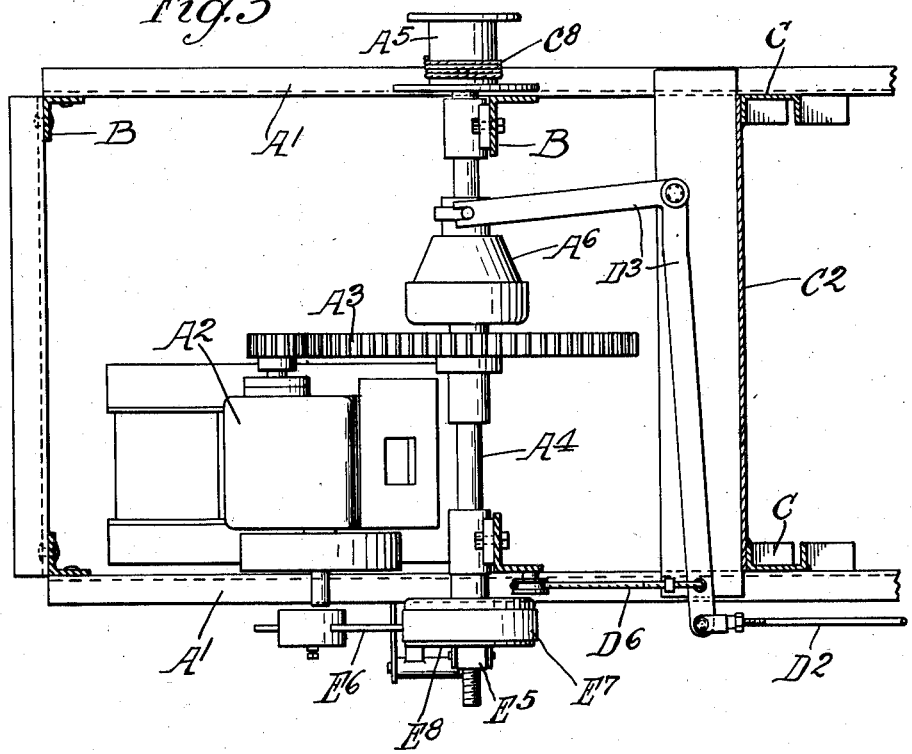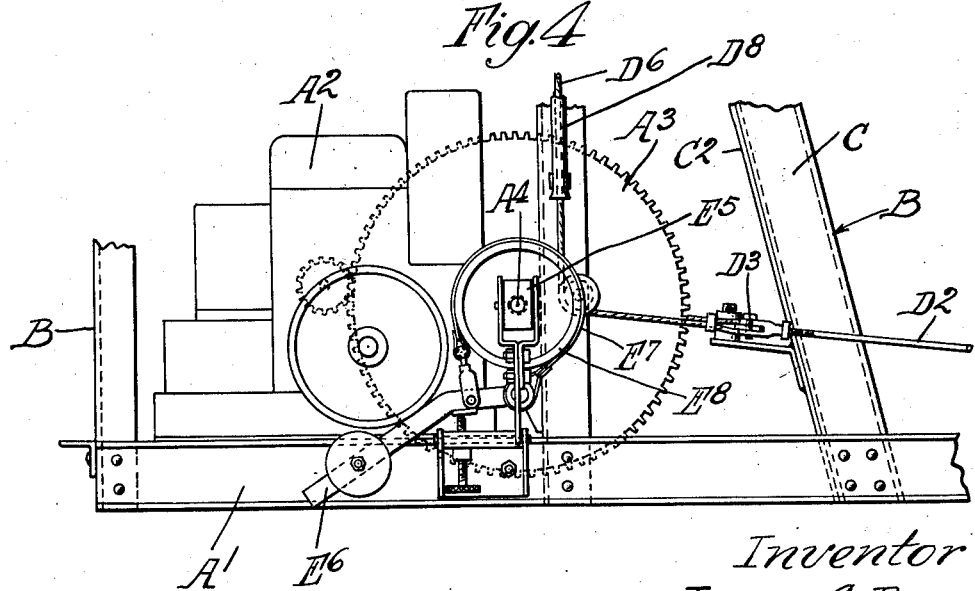

Oct. 23, 1934.    J. C. REAR    1,978,226
CAR ICER
Filed July 21, 1932    6 Sheets-Sheet 5

Inventor
James C. Rear
by Parker & Carter
Attorneys.

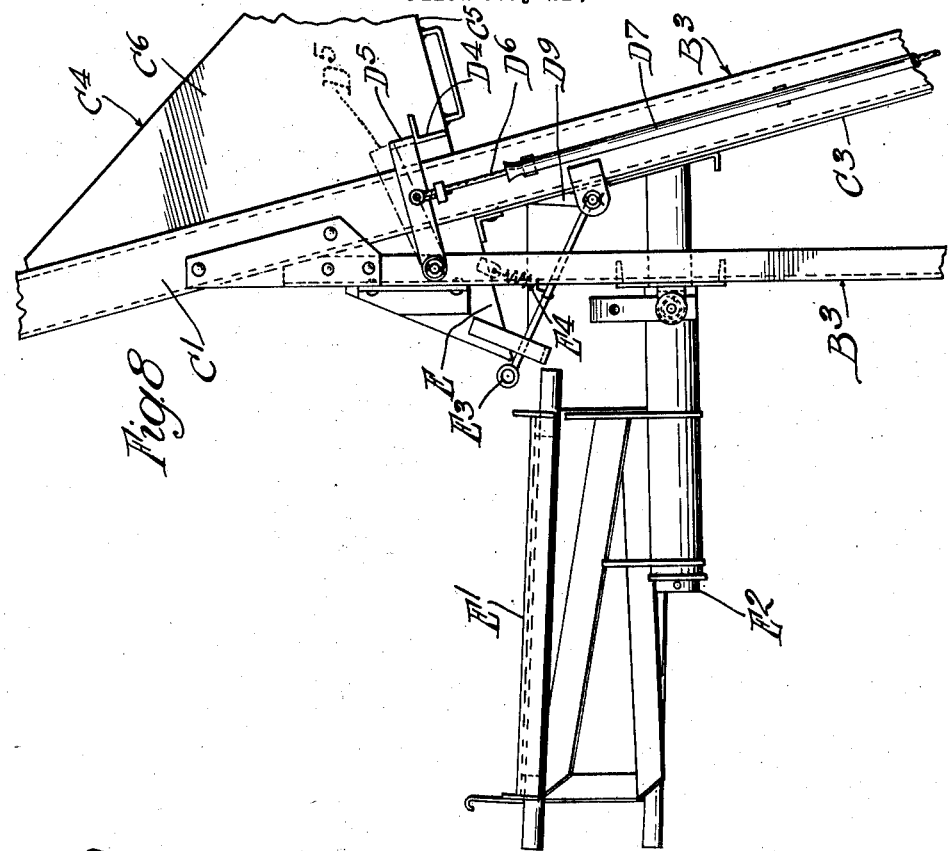
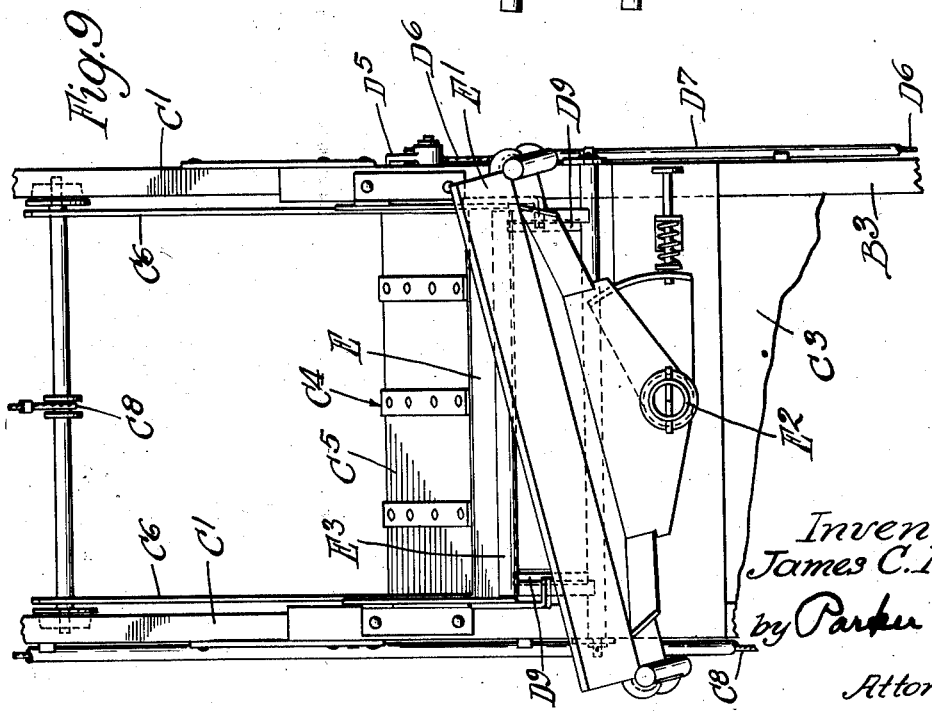

Patented Oct. 23, 1934

1,978,226

UNITED STATES PATENT OFFICE 1,978,226

CAR ICER

James C. Rear, San Francisco, Calif., assignor to Link-Belt Company, Chicago, Ill., a corporation of Illinois Application July 21, 1932, Serial No. 623,711

13 Claims. (Cl. 214—100)

My invention relates to improvements in car icers for icing railroad cars and the like and has for one object to provide a new and improved form of apparatus which can be moved about either independently or in connection with an ice truck and may be positioned wherever desired to provide largely automatic power means for unloading ice from the ice truck and depositing it for instance in a refrigerator car. Other objects of my invention will appear from time to time throughout the specification and claims.

My invention is illustrated more or less diagrammatically in the accompanying drawings, wherein—

Figure 2 is a rear elevation;

Figure 3 is a plan view of the drive mechanism;

Figure 4 is a side elevation of the drive mechanism;

Figure 5 is a side elevation of the brake mechanism controlling the hoisting tray;

Figure 6 is a section through the line 6—6 of Figure 5;

Figure 8 is a similar view to Figure 7 showing the parts in elevation;

Figure 9 is a front elevation of Figure 8;

Like parts are indicated by like characters throughout the specification and drawings.

Figure 1:
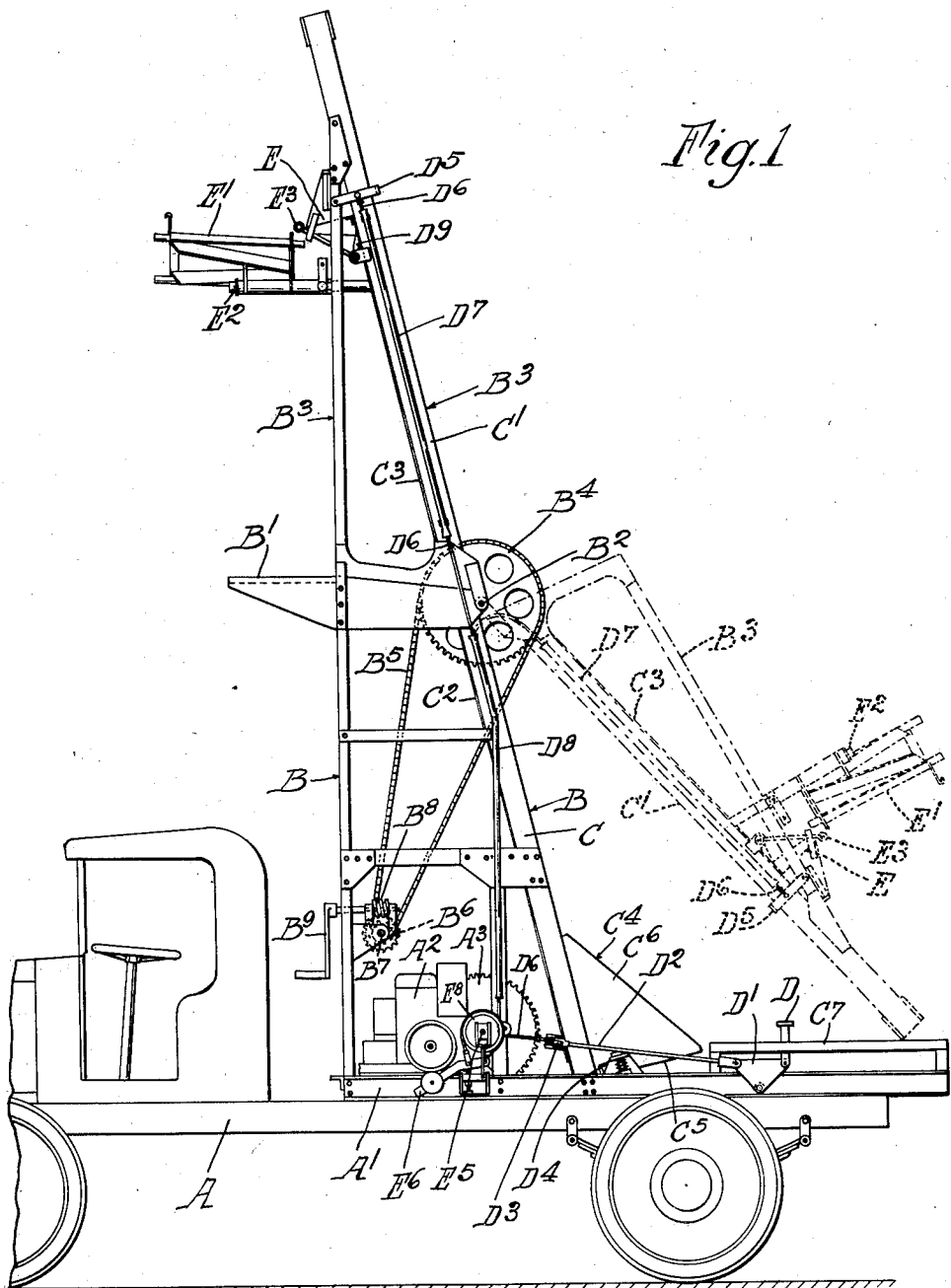
Figure 1 is a side elevation.
Figure 7:
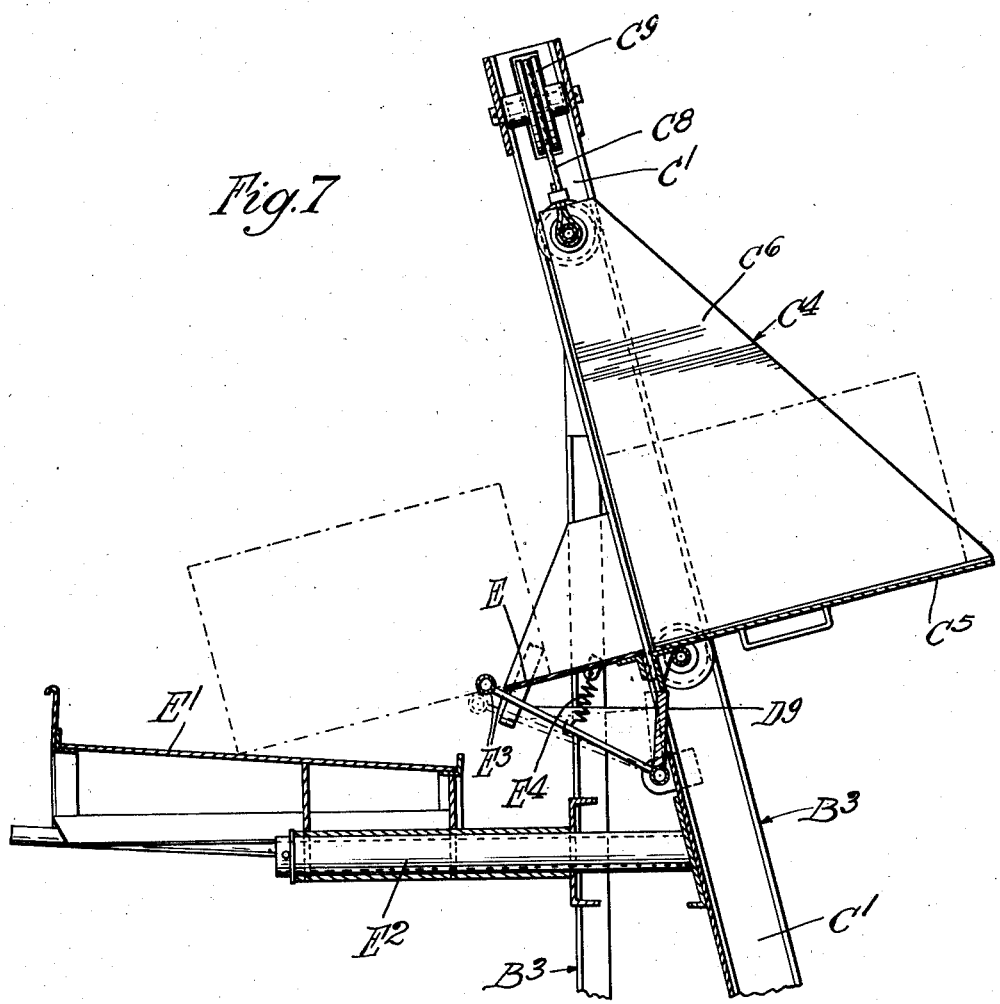
Figure 7 is a section through the line 7—7 of Figure 2 showing the hoisting tray in discharging position.

A is an automotive truck, trailer or other movable support. Mounted on this truck is a supporting platform $A^1$ which may be fixed or movable on the truck as the case may be and carries a gasoline or electric hoisting engine $A^2$, driving through a gear train $A^3$, a hoisting shaft $A^4$ having a hoisting drum $A^5$, there being a clutch $A^6$ interposed between the gear train $A^3$ and the shaft $A^4$ whereby the drive may be controlled.

Projecting upward from the platform $A^1$ is an A-frame B. At its upper end, it carries a working platform $B^1$ and a pivot $B^2$. On this pivot is mounted the extension frame $B^3$ which may be in the down position as shown in dotted lines or in the up position as shown in full lines. When in such position it rests of course upon the upper end of the frame B. $B^4$ is a chain sprocket associated with the frame $B^3$ and concentric with the pivot $B^2$. Traveling over it is a chain $B^5$ which travels over a small sprocket $B^6$ on the shaft $B^7$ which is adapted to be rotated by the worm $B^8$ from the hand crank $B^9$ so that the operator may by manipulating the crank $B^9$ raise the extension frame into the upright position where it stays held by gravity or by the irreversible worm or may rotate it into the lower position for shipment.

The frames B $B^3$ carry guides or tracks C $C^1$ between which are back plates $C^2$ $C^3$. A hoisting tray $C^4$ travels along the guides. It has an inclined bottom $C^5$, side walls $C^6$ and is open at the rear. The working platform $C^7$ terminates in line with the upper edge of the bottom $C^5$. $C^8$ is a hoisting cable extending from the tray $C^4$ over sheaves $C^9$ $C^{10}$ at the upper end of the frame $B^3$ down to the hoisting drum $A^5$. In use, this device is moved into position alongside of the refrigerator car or any other container into which ice is to be hoisted. The ice supply such as in a truck is then backed up to it and the operators move cakes of ice from the truck along the platform $C^7$ onto the hoisting tray where the ice stays by gravity, being supported by the bottom $C^5$ resting against the back plates $C^2$ $C^3$.

The operator when the ice cake is positioned, puts his foot on the button D which by means of the bell crank lever $D^1$, the link $D^2$ and the clutch lever $D^3$ operate the clutch $A^6$ to cause the motor to wind up the hoisting rope and raise the skip. When the skip or tray reaches the upper end of its excursion, a projection $D^4$ on the tray engages the lever $D^5$ exerting a tension on the control cable $D^6$ which cable passes down through the pipe guides $D^7$ $D^8$ to disengage the clutch. Meanwhile, the skip has passed up beyond the stop latches $D^9$ pivoted at the upper end of the frame $B^3$ so that the skip is held in the uppermost position independent of the hoisting mechanism.

The back plate $C^3$ terminates at the upper excursion of the skip and so the ice slides by gravity off the floor $C^5$ onto the guideplate E and thence onto the ice chute $E^1$ which is pivoted on the chute pivot arm $E^2$ on the frame $B^3$. As the ice takes this travel it engages the latch lever arm $E^3$ extending the spring $E^4$, releasing the latch $D^9$ and permitting the hoisting tray or skip to be lowered to receiving position. As the hoisting tray or skip is lowered, it causes the drive shaft $A^4$ to rotate in the opposite direction, causing the traveling nut $E^5$ to move laterally to release the weighted brake lever $E^6$ to exert a tension on the brake band $E^7$ on the brake drum $E^8$ and thereby check the velocity of the skip as it descends.

Figure 10:
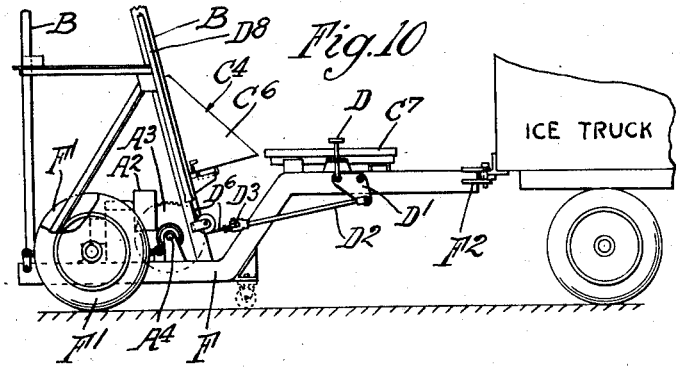
Figure 10 is a partial side elevation of a modified form of the device.

In the modified form of the device shown in Figure 10, instead of being mounted on a self-propelled motor vehicle, the device is mounted on a trailer truck F having wheels F¹ adapted to be supported at its forward end by means of the tongue F² on the rear end of the ice truck. The other elements of the device are similar except that this permits the motor being placed on the truck at a point below the working platform.

Obviously while my invention as disclosed in the specification and drawings contemplates a particular portable arrangement of icing elevator, nevertheless elements of the apparatus might equally be used in a non-portable structure and it is equally possible that the working platform might be disassociated from the elevator. Also the device might be used under many circumstances for purposes other than filling railroad cars, for instance filling ice storage houses, barns, etc.

Where for the purpose of clearness in the claims I have referred to a portable car icing elevator comprising an automotive truck, it will be understood that the elevator might comprise a fixed frame or a truck other than an automotive truck and I wish my claims to be interpreted as covering such a structure as this.

When my device is used to ice freight cars, it will be arranged with the longitudinal axis of the truck parallel with the tracks on which the cars stand. The chute at the top of the frame is pivoted on the sleeve E² and may therefore rotate about a generally horizontal axis parallel with the axis of the truck. The extension trough members as shown in Figure 2 are hooked onto the pivoted chute and form a continuation of it. The chute is held against undesired rotation by friction and by relation with the extensions hooked as they are to it. It will be understood that the pivot for the chute is in the middle of the ice track so the ice cake will normally be generally balanced on the pivoted chute so the tendency to rotate it will be a minimum.

To make the position of the chute even more positive the spring held latch shown in end elevation in Figure 8 and in side elevation in Figure 9 engaging an apertured quadrant is also provided. The action of the brake is shown in Figures 3 to 6 inclusive. The threaded screw is mounted so that it may be adjusted toward or from the pad on the brake lever. The screw is carried on the lever controlled by the nut E⁵ and as that nut moves to the right or left it causes a rotation of the pivot of the lever and raises or lowers the screw as the case may be to limit or prevent the downward excursion of the weight.

I claim:

1. A portable elevator for icing cars and the like comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform when the skip is in the lower position, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means associated with the working platform whereby the clutch may be operated to cause upward movement of the skip, automatic means for locking the skip in upper position, means controlled by the skip and operative at the upper end of its excursion for releasing the clutch.

2. A portable elevator for icing cars and the like comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means associated with the working platform whereby the clutch may be operated to cause upward movement of the skip, means controlled by the skip and operative at the upper end of its excursion for releasing the clutch, automatic means for locking the skip in upper position, the ice cake engaging track terminating at the upper excursion of the skip, a chute associated therewith in line with the floor of the skip and means associated with the chute projecting into the path of travel of an ice cake traveling therealong for releasing the skip holding means.

3. A portable elevator for icing cars and the like comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means associated with the working platform whereby the clutch may be operated to cause upward movement of the skip, automatic means for locking the skip in upper position, means controlled by the skip and operative at the upper end of its excursion for releasing the clutch, the ice cake engaging track terminating at the upper excursion of the skip, a chute associated therewith in line with the floor of the skip and means associated with the chute projecting into the path of travel of an ice cake traveling therealong for releasing the skip holding means, automatic means for controlling the downward descent of the skip.

4. A portable elevator for icing cars and the like comprising a truck, an ice hoisting skip, a frame along which it is adapted to reciprocate in generally vertical direction, the floor of the skip being downwardly inclined toward the frame, means for normally preventing gravital movement of an ice cake along the floor of the skip, said means being adapted at the upper end of the skip excursion to release the cake to permit its gravital discharge from the skip, a hoisting mechanism for the skip and automatic means for disconnecting the skip and the hoisting mechanism at the upper end of its excursion and for simultaneously latching the skip against downward movement.

5. A portable elevator for icing cars and the like comprising a truck, an ice hoisting skip, a frame along which it is adapted to reciprocate in generally vertical direction, the floor of the skip being downwardly inclined toward the frame, means for normally preventing gravital movement of an ice cake along the floor of the skip, said means being adapted at the upper end of the skip excursion to release the cake to permit its gravital discharge from the skip, a hoisting mechanism for the skip and automatic means for disconnecting the skip and the hoisting mechanism at the upper end of its excursion and for latching the skip against downward movement, means in the path of the ice cake so positioned that the cake engages said means after it has left the skip for releasing the skip and permitting its downward movement.

6. A portable elevator for icing cars and the like comprising a truck, an ice hoisting skip, a frame along which it is adapted to reciprocate in generally vertical direction, the floor of the skip being downwardly inclined toward the frame, means for normally preventing gravital movement of an ice cake along the floor of the skip, said means being adapted at the upper end of the skip excursion to release the cake to permit its gravital discharge from the skip, a hoisting mechanism for the skip and automatic means for disconnecting the skip and the hoisting mechanism at the upper end of its excursion and for latching the skip against downward movement, means in the path of the ice cake so positioned that the cake engages said means after it has left the skip for releasing the skip and permitting its downward movement, and a brake associated with the skip and automatic means for increasing the power of the brake to gradually retard the speed of the skip as it travels under gravity toward its lower excursion.

7. A portable elevator for icing cars and the like, comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform when the skip is in the lower position, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means whereby the clutch may be operated to cause upward movement of the skip, automatic means controlled by the skip and operative near the upper end of its excursion for releasing the clutch, and automatic means for holding the skip near its upper position while the cake of ice is being discharged from the skip.

8. A portable elevator for icing cars and the like comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means whereby the clutch may be operated to cause upward movement of the skip, means controlled by the skip and operative at the upper end of its excursion for releasing the clutch, automatic means for locking the skip in upper position, the ice cake engaging track terminating at the upper excursion of the skip, a chute associated therewith in line with the floor of the skip and means associated with the chute projecting into the path of travel of an ice cake traveling therealong for releasing the skip holding means.

9. A portable elevator for icing cars and the like comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means associated with the working platform whereby the clutch may be operated to cause upward movement of the skip, means controlled by the skip and operative at the upper end of its excursion for releasing the clutch, automatic means for locking the skip in upper position, the ice cake engaging track terminating at the upper excursion of the skip, a chute associated therewith approximately in line with the floor of the skip and means positioned along the path of travel of the released ice cake for freeing the skip holding means when the skip is near its upper position.

10. A portable elevator for icing cars and the like comprising a truck, an ice receiving working platform thereon, an ice hoisting skip, a frame along which it is adapted to reciprocate in generally vertical direction, the floor of the skip being downwardly inclined toward the frame, the upper edge of the floor being in general alignment with the working platform, the skip being open toward the frame and an ice cake engaging track on the frame adapted to prevent gravital movement of the ice cake off the skip, a hoisting engine on the truck, a sheave at the top of the frame, a cable extending from the hoisting engine over the sheave and down to the skip, a clutch interposed between the cable and the engine, means associated with the working platform whereby the clutch may be operated to cause upward movement of the skip, automatic means for locking the skip in upper position, means controlled by the skip and operative at the upper end of its excursion for releasing the clutch, the ice cake engaging track terminating at the upper excursion of the skip, a chute associated therewith approximately in line with the floor of the skip and means positioned along the path of travel of the released cake of ice for freeing the skip holding means near its upper position, automatic means for controlling the downward descent of the empty skip thereafter.

11. A portable elevator for icing cars and the like comprising a truck, an ice hoisting skip, a frame along which it is adapted to reciprocate in generally vertical direction, the floor of the skip being downwardly inclined toward the frame, means for normally preventing gravital movement of an ice cake along the floor of the skip, said means being adapted at the upper end of the skip excursion to release the cake to permit its gravital discharge from the skip, a hoisting mechanism for the skip and automatic means engaged and operated by the skip for disconnecting it and the hoisting mechanism near the upper end of its excursion and for preventing further downward movement of the skip.

12. A portable elevator for icing cars and the like comprising a truck, an ice hoisting skip, a frame along which it is adapted to reciprocate in generally vertical direction, the floor of the skip being downwardly inclined toward the frame, means for normally preventing gravital movement of an ice cake along the floor of the skip, said means being adapted at the upper end of the skip excursion to release the cake to permit its gravital discharge from the skip, a hoisting mechanism for the skip and automatic means for disconnecting the skip and the hoisting mechanism at the upper end of its excursion and for latching the skip against downward movement, means along the path of travel of the released ice cake so positioned that the cake engages said means after it has been released from the skip for freeing the empty skip and permitting its downward movement.

13. A portable elevator for icing cars and the like comprising a truck, an ice hoisting skip, a frame along which it is adapted to reciprocate in generally vertical direction, the floor of the skip being downwardly inclined toward the frame, means for normally preventing gravital movement of an ice cake along the floor of the skip, said means being adapted at the upper end of the skip excursion to release the cake to permit its gravital discharge from the skip, a hoisting mechanism for the skip and automatic means for disconnecting the skip and the hoisting mechanism at the upper end of its excursion and for latching the skip against downward movement, means in the path of the ice cake so positioned that the cake engages said means after it has left the skip for releasing the skip and permitting its downward movement, and a brake and automatic means for controlling said brake to regulate the speed of the empty skip on its downward travel under gravity while being lowered to loading position.

JAMES C. REAR.